United States Patent
Goel et al.

(10) Patent No.: US 12,067,141 B2
(45) Date of Patent: *Aug. 20, 2024

(54) SYSTEMS AND METHODS FOR AN ON-DEMAND, SECURE, AND PREDICTIVE VALUE-ADDED DATA MARKETPLACE

(71) Applicant: Collibra Belgium BV, Brussels (BE)

(72) Inventors: Satyender Goel, Chicago, IL (US); James B. Cushman, II, Longboat Key, FL (US)

(73) Assignee: Collibra Belgium BV, Brussels (BE)

( * ) Notice: Subject to any disclaimer, the term of this patent is extended or adjusted under 35 U.S.C. 154(b) by 43 days.

This patent is subject to a terminal disclaimer.

(21) Appl. No.: 17/219,340

(22) Filed: Mar. 31, 2021

(65) Prior Publication Data
US 2022/0318418 A1   Oct. 6, 2022

(51) Int. Cl.
*G06F 21/62* (2013.01)
*G06F 21/60* (2013.01)
(Continued)

(52) U.S. Cl.
CPC ........ *G06F 21/6227* (2013.01); *G06F 21/602* (2013.01); *G06F 21/6245* (2013.01); *G06Q 30/0201* (2013.01); *G06Q 50/265* (2013.01)

(58) Field of Classification Search
CPC ............... G06F 21/6227; G06F 21/602; G06F 21/6245; G06F 21/6254; G06F 16/22;
(Continued)

(56) References Cited

U.S. PATENT DOCUMENTS 7,809,659 B1  10/2010 Paiz
8,843,997 B1   9/2014 Hare
(Continued)

FOREIGN PATENT DOCUMENTS

EP   1118948 A2    7/2001
EP   1391835 A2 *  2/2004   ......... G06F 16/9558
(Continued)

OTHER PUBLICATIONS

Durham E, Xue Y, Kantarcioglu M, Malin B. Quantifying the Correctness, Computational Complexity, and Security of Privacy-Preserving String Comparators for Record Linkage. Inf Fusion. Oct. 1, 2012;13(4):245-259. doi: 10.1016/j.inffus.2011.04.004. PMID: 22904698; PMCID: PMC3418825 (Year: 2012).*
PCT/EP2022/057331, International Search Report and Written Opinion, mailed Aug. 1, 2022, 22 pgs.
Kho Abel N et al: "Design and implementation of a privacy preserving electronic health record linkage tool in Chicago", Journal of the American Medical Informatics Association, vol. 22, No. 5, Sep. 1, 2015 (Sep. 1, 2015), pp. 1072-1080, XP055937846.
(Continued)

*Primary Examiner* — Meng Li
*Assistant Examiner* — Felicia Farrow
(74) *Attorney, Agent, or Firm* — Perkins Coie LLP

(57) ABSTRACT

A data marketplace for enriching data records by matching, identifying composite data records, and utilizing Reference Source datasets. Customer data can be tokenized and then subsequently transmitted to a third-party Data Marketplace Platform. Similarly, a Reference Source dataset may be tokenized and transmitted to a Data Marketplace Platform. On the Data Marketplace Platform, the customer data and the reference source data may be compared, wherein certain data attributes (i.e., tokens on the Data Marketplace Platform) may be identified as missing in the customer dataset and present in the reference source dataset. The customer may then have the ability to acquire the missing and value-added data attributes by transacting with the reference source via a data broker, such as the Data Marketplace Platform.

20 Claims, 10 Drawing Sheets

(51) Int. Cl.
*G06Q 30/0201* (2023.01)
*G06Q 50/26* (2024.01)

(58) Field of Classification Search
CPC .. G06F 16/215; G06F 16/24558; G06F 16/27; G06F 16/2365; G06Q 30/0201; G06Q 50/265; G06Q 50/26; G06Q 40/025; H04L 9/0643
See application file for complete search history.

(56) References Cited

U.S. PATENT DOCUMENTS

| | | | |
|---|---|---|---|
| 9,998,435 | B1 | 6/2018 | Kothari et al. |
| 10,623,406 | B2 | 4/2020 | Maker et al. |
| 10,877,947 | B2 | 12/2020 | Iska et al. |
| 10,929,441 | B1* | 2/2021 | Phillips ............... G06F 16/258 |
| 11,245,706 | B2 | 2/2022 | Kuperman et al. |
| 11,694,093 | B2 | 7/2023 | Perez et al. |
| 2002/0073099 | A1* | 6/2002 | Gilbert .................. G06F 16/30 |
| 2002/0095397 | A1* | 7/2002 | Koskas ............. G06F 16/2237 |
| 2004/0107203 | A1 | 6/2004 | Burdick et al. |
| 2010/0211780 | A1 | 8/2010 | Mukkara et al. |
| 2012/0197887 | A1* | 8/2012 | Anderson ........... G06F 16/2365 707/736 |
| 2015/0199744 | A1 | 7/2015 | Tolvanen et al. |
| 2016/0092557 | A1* | 3/2016 | Stojanovic ............ G06F 16/248 707/723 |
| 2016/0283735 | A1 | 9/2016 | Wang et al. |
| 2017/0366348 | A1 | 12/2017 | Weimer et al. |
| 2018/0278584 | A1 | 9/2018 | Kuperman et al. |
| 2018/0330428 | A1* | 11/2018 | Rosenthal .......... G06Q 30/0631 |
| 2019/0095644 | A1 | 3/2019 | Park et al. |
| 2019/0139215 | A1 | 5/2019 | Starr et al. |
| 2019/0179888 | A1 | 6/2019 | Saillet et al. |
| 2019/0245693 | A1 | 8/2019 | Iyer et al. |
| 2019/0361932 | A1 | 11/2019 | Hoffert et al. |
| 2020/0184100 | A1 | 6/2020 | Ong et al. |
| 2021/0049396 | A1 | 2/2021 | Radmer |
| 2021/0105286 | A1 | 4/2021 | Kuperman et al. |
| 2021/0232701 | A1 | 7/2021 | Goel et al. |

FOREIGN PATENT DOCUMENTS

| | | | |
|---|---|---|---|
| WO | 2001046889 | A2 | 6/2001 |
| WO | 2016049437 | A1 | 3/2016 |
| WO | 2017161403 | A1 | 9/2017 |
| WO | 2019183483 | A2 | 9/2019 |
| WO | WO-2021170411 | A1 * | 9/2021 |

OTHER PUBLICATIONS

Scott Duke Kominers: "Good markets (really do) make good neighbors", ACM SIGECOM Exchanges, ACM, 2 Penn Plaza, Suite 701 New York NY10121-0701 USA, vol. 16, No. 2, May 7, 2019 (May 7, 2019), pp. 12-26, XP058430304.

Christen Peter: "Record Linkage: Introduction, Recent Advances, and Privacy Issues Motivation", Jul. 1, 2019 (Jul. 1, 2019), pp. 1-110, XP055944429.

Franke Martin et al: "PRIMAT: a toolbox for fast privacy-preserving matching", Proceedings of the VLDB Endowment, vol. 12, No. 12, Aug. 1, 2019 (Aug. 1, 2019), pp. 1826-1829, XP055944544.

International Search Report and Written Opinion mailed Feb. 25, 2022 for International Patent Application No. PCT/US2021/082677, 16 pages.

International Search Report and the Written Opinion of the International Searching Authority for PCT/IB2021/050740 mailed Apr. 21, 2021, 13 pages.

Jongho Nang et al., "A Hierarchical Bitmap Indexing Method for Similarity Search in High Dimensional Multimedia Databases" Journal of Information Science and Engineering 26, 393-407 (2010), Sogang University, Seoul Korea, 16 pgs. total.

* cited by examiner

SYSTEMS AND METHODS FOR AN ON-DEMAND, SECURE, AND PREDICTIVE VALUE-ADDED DATA MARKETPLACE

CROSS-REFERENCE TO RELATED APPLICATION(S)

Patent application Ser. No. 16/844,927, titled "CONTEXT DRIVEN DATA PROFILING"; patent application Ser. No. 16/776,293 titled "SYSTEMS AND METHOD OF CONTEXTUAL DATA MASKING FOR PRIVATE AND SECURE DATA LINKAGE"; patent application Ser. No. 17/103,751, titled "SYSTEMS AND METHODS FOR UNIVERSAL REFERENCE SOURCE CREATION AND ACCURATE SECURE MATCHING"; and patent application Ser. No. 17/103,720, titled "SYSTEMS AND METHODS FOR DATA ENRICHMENT" are hereby incorporated by reference in their entirety.

TECHNICAL FIELD

The present disclosure relates to systems and methods for an on-demand secure and predictive value added data marketplace.

BACKGROUND

Entities maintain large amounts of data that may be disorganized and/or incomplete. For example, an entity may maintain more than one incomplete record related to a subject, such as an individual, product, organization, etc. One record may contain a subject's address, email, gender, and geographic location, while the other record may contain a subject's name, address, phone number, date-of-birth, and credit card information. Each of these records may be incomplete. Similar incomplete records may exist for products and organizations. Currently, entities desiring to reconcile these disjointed records typically must manually combine these records, which results in inefficient and time-consuming processes, as well as potential exposure to personally identifiable information. Patent application Ser. Nos. 17/103,751 and 17/103,720 (both incorporated by reference in their entireties herein) aim to solve this problem.

Once records from a single entity are combined, however, certain data attributes may still be missing from a consolidated record. For example, a record of a data subject may include the data attributes of name, date-of-birth, address, and phone number, but the record may be missing a gender data attribute. Other organizations that collect data from the same data subject may have the gender data attribute recorded. Yet, the organization missing that data attribute may not be aware of which organization has that data attribute or how to obtain that missing data attribute. Modern day enterprises are hampered when it comes to accurate data collection and creating fulsome and complete data records.

As such, there is an increased need for systems and methods that can address the challenges of modern-day data collection and reconciliation, including the deficiencies of possessing incomplete data records when other organizations (e.g., trusted named sources/entities) may have those data attributes.

Data is becoming an essential part of most enterprises, and there are more true copies of information available, which can be valuable to many outside stakeholders. There is a need for a secure platform where enterprises can find data for their use cases to buy and also find use cases for their data to sell. A one-of-a-kind data marketplace where need and value of the data transaction is proactively made visible.

It is with respect to these and other general considerations that the aspects disclosed herein have been made. Also, although relatively specific problems may be discussed, it should be understood that the examples should not be limited to solving the specific problems identified in the background or elsewhere in the disclosure.

BRIEF DESCRIPTION OF THE DRAWINGS

Non-limiting and non-exhaustive examples are described with reference to the following FIGURES.

DETAILED DESCRIPTION

Figure 1:
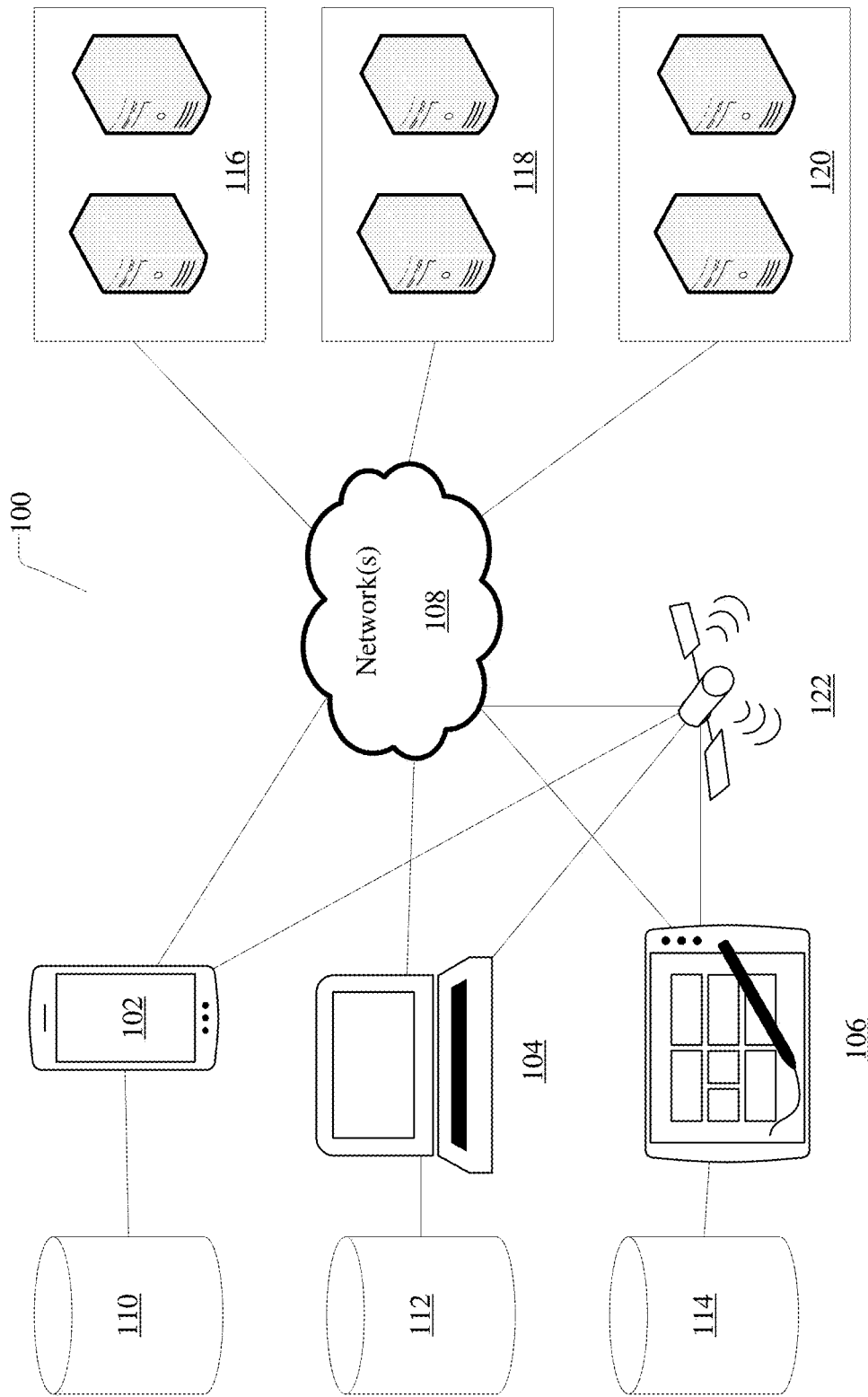
FIG. 1 illustrates an example of a distributed system for a data marketplace, as described herein.

Various aspects of the disclosure are described more fully below with reference to the accompanying drawings, which form a part hereof, and which show specific exemplary aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems, or devices. Accordingly, aspects may take the form of a hardware implementation, an entirely software implementation or an implementation combining software and hardware aspects. The following detailed description is, therefore, not to be taken in a limiting sense.

Embodiments of the present application are directed at systems and methods associated with data matching, data profiling, data masking, data consolidating, and data enrichment within a data marketplace. Data matching processes can be used to generate insights into data that may increase data quality. Once a data record is matched, however, certain data attributes may still be missing from the data record. To fill in these gaps, an organization may seek to obtain certain missing data attributes via a data marketplace. For example, an organization may have a data record regarding a certain business entity but may be missing a certain data attribute (e.g., employee head count). The employee head count data attribute may be possessed by a third-party trusted source that the organization may engage to obtain that missing data attribute. To obtain this missing data attribute, the organization may interact and transact with the third-party trusted source via a data marketplace. Data availability for the use case or organizational needs made visible on the data marketplace may be via use of tokens. In other words, prior to a customer and prior to a trusted source entering the data marketplace, the customer and trusted reference source may need to "mask" their data in order to create private and secure tokens that may be analyzed and compared.

Data masking may refer to the hashing and/or encryption of client-specific information. Throughout this patent application, "client" may refer to the Customer and/or the Reference Source. In order for an entity to transmit sensitive data (e.g., PII) to a third-party (e.g., Data Marketplace Platform), the data usually should be tokenized. In some examples described here, client-specific information may be first hashed and encrypted and then uploaded to a secure server. The tokenized information may be retrieved from the secure server and analyzed. The tokenized client-specific information (i.e., "client tokens") may be tokenized using a combination of hash (one way compression function) and/or encrypted, wherein the hash code may include an additional computer-generated Secure Hash Algorithm (SHA2 512/256) salt. Other hashing and encryption methods may be used, including but not limited to, SHA2 348, SHA3, TripleDES, Twofish encryption algorithms, Blowfish encryption algorithms, Advanced Encryption Standard (AEs), IDEA encryption algorithm, MD5 encryption algorithms, and/or RSA security encryption algorithms. When the third-party server receives information transmitted from a Customer or Reference Source, the information is in the form of tokens. In other words, the raw data from the Customer and/or Reference Source (i.e., "client") is hashed and encrypted prior to being transmitted to the third-party secure server. The Data Marketplace Platform does not receive or process raw data.

In some example aspects, a first label included in a listing of anonymized labels that corresponds to a type of information in a tokenized attributed based on an identified classifier may be included. The label can provide an anonymized identifier of a type of information represented in the attribute. The label can be generated based on any of the attribute and the classifier. For example, if an attribute relates to a name, the corresponding label can be "La1." In these embodiments, only entities with access to a listing of the information corresponding to the labels can identify the type of information identified by each label, thereby anonymizing the data. To the third-party Data Marketplace Platform, the actual, unencrypted attribute or classifier may be unknown due to the tokenization of the data. For example, a certain attribute may refer to a data subject's address and have a label of "Address," but once labelized, this label may be token "La1" to the third-party Data Marketplace Platform. Further description of this process can be found in U.S. patent application Ser. No. 16/844,927, which is incorporated by reference in its entirety.

Data consolidating refers to consolidating two or more data records to create a single data record. For instance, a data record may include the data attributes of Name, DOB, Gender, and Email address. Another data record may include the data attributes of Name, Gender, Home address, and Phone number. If these two records are consolidated, then a single data record may be created that includes the data attributes of Name, DOB, Gender, Email address, Home address, and Phone number. Once consolidated, the consolidated data record may be known as a "composite."

A data composite may be useful to entities that may have multiple data records associated with a single data subject. For example, a bank may have a data record for a data subject's checking account and a data record for that same data subject's home loan. Both of these data records may include overlapping information, but one data record may include certain data attributes that the other data record does not include. As such, creating a composite of these data records may be beneficial to the entity, resulting in greater efficiency and higher levels of data integrity.

As described herein, an entity may utilize the systems and methods presented to enrich its data composites by filling in missing data attributes via a data marketplace. For instance, a bank may have certain data composite records associated with certain data subjects. Each data attribute may receive a data quality (DQ) score. The DQ score may indicate to the entity to what extent the data attribute is complete. The aggregated DQ scores of independent attributes may make up a "Value Score" for each data record. For instance, an organization may have five different data records associated with a single data subject. If each of those five data records has the same Gender data attribute listed for each of the data records, the DQ score for the Gender attribute may be relatively high (e.g., 90/100). However, if only one of the five data records has the data attribute of Social Security Number (SSN), then that data attribute may receive a relatively low DQ score (e.g., 30/100), since the entity may not have other corroborating data to verify the integrity of that data attribute for that specific data subject.

To address this issue of low DQ scores and increase data integrity, the systems and methods presented herein utilize trusted Reference Sources to corroborate data records and fill in potential missing data attributes for a data record. A Reference Source is an entity that has data that is used as a reference point. For example, a Reference Source may be a "trusted" source (e.g., trusted named organization), like a credit bureau, a bank, and/or a government entity. However, because "trust" is subjective, for purposes of this application, a Reference Source is any source that is used as a reference for comparison against another source (e.g., Customer source). For example, a Customer may have multiple data records for a data subject, but some data attributes may be missing. The Customer may hash and encrypt this data (i.e., transform the raw data into tokens) and then upload the tokens to a secure server where a third-party Data Marketplace Platform may access the Customer tokens. Additionally, a Reference Source may have complete and verified records (i.e., "trusted" records) that are hashed and encrypted (i.e., tokenized) and then uploaded to a secure server managed by the Data Marketplace Platform. The third-party Data Marketplace Platform may access the Reference Source tokens. The third-party Data Marketplace Platform may then enable the enrichment of the Customer data by matching the Customer tokens to the Reference Source tokens.

In some aspects, Customer tokens and Reference Source tokens may be received by the system. The Customer tokens and Reference Source tokens may be analyzed and compared. The results of the analysis and comparison may reveal various deficiencies in the Customer tokens that may be remedied by the Reference Source tokens when and if the Reference Source transmits those data attributes to the Customer. Certain tokenized data attributes of the Customer tokens may be identified as having low DQ scores and/or may be completely missing. The data attributes with low DQ scores and/or that may be missing may be populated by the Reference Source tokens in the Customer environment.

Specifically, the third-party Data Marketplace Platform enables the enrichment and consolidation of data, but the actual enriching and consolidating of the data occurs in the Customer Environment. In other aspects, the data enrichment can be enabled at a query level. The data marketplace may be a conduit for client business and technical queries, highlight data shortcomings via a value score and present alternatives for data enrichment from the marketplace data vendor options. Data marketplace options may have a cost and ranking based on the potential value-add to a certain client's use case.

Accordingly, the present disclosure provides a plurality of technical benefits including but not limited to: enabling more efficient use of electronic resources for data matching, consolidating, and enabling data enrichment; providing more efficient storage management, since the matching, consolidating, and enrichment of a dataset may occur at a single third-party server; decreasing potential exposure of sensitive data, since all data transmitted to the third party servers is tokenized (i.e., hashed and encrypted); and decreasing manual overload of electronic devices, since the data matching, consolidating, and enrichment occur via computing devices running intelligent algorithms to identify deficiencies in a dataset and remedying those deficiencies from a Reference Source dataset, among other examples.

FIG. 1 illustrates an example of a distributed system for a data marketplace, as described herein. Example system 100 presented is a combination of interdependent components that interact to form an integrated whole for consolidating and enriching data on a data marketplace. Components of the systems may be hardware components or software implemented on, and/or executed by, hardware components of the systems. For example, system 100 comprises client devices 102, 104, and 106, local databases 110, 112, and 114, network(s) 108, and server devices 116, 118, and/or 120.

Client devices 102, 104, and 106 may be configured to receive and transmit data. For example, client devices 102, 104, and 106 may contain client-specific data. Client devices may download a third-party tokenization software program via network(s) 108 that may be applied to the client-specific data. The client-specific data may be stored in local databases 110, 112, and 114. Once tokenized, the client-specific data is transformed into "tokens," and these tokens may be transmitted via network(s) 108 and/or satellite 122 to server(s) 116, 118, and/or 120. Server(s) 116, 118, and/or 120 may be third-party servers owned by a Data Marketplace Platform. In other examples, client-specific data may be stored in servers (in addition to or instead of local client devices and local databases) and may be tokenized and then transmitted from client servers to third-party servers via network(s) 108 and/or satellite 122.

In aspects, a client device, such as client devices 102, 104, and 106, may have access to one or more datasets or data sources and/or databases comprising client-specific data. In other aspects, client devices 102, 104, and 106, may be equipped to receive broadband and/or satellite signals carrying client-specific tokens or unencrypted data (or a mixture of both). The signals and information that client devices 102, 104, and 106 may receive may be transmitted from satellite 122. Satellite 122 may also be configured to communicate with network(s) 108, in addition to being able to communicate directly with client devices 102, 104, and 106. In some examples, a client device may be a mobile phone, a laptop computer, a tablet, a smart home device, a desk phone, and a wearable (e.g., a smart watch), among other devices.

To further elaborate on the network topology, client devices 102, 104, and/or 106 (along with their corresponding local databases 110, 112, and 114) may be owned by a Reference Source. The client devices 102, 104, and/or 106 may download a third-party software program to tokenize the data. The tokens from the Reference Source may be stored locally in local databases 110, 112, and/or 114. In other examples, the tokens may be stored in remote databases/servers 116, 118, and/or 120. In other examples, the tokens may be harbored in both local and external databases. After tokenization, the Reference Source may transmit data via client device(s) 102, 104, and/or 106 that are configured to communicate with local databases 110, 112, 114 and servers 116, 118, and 120. The tokens from the Reference Source may be transmitted via network(s) 108 and/or satellite 122. The Reference Source tokens may be received by third-party servers.

The procedure for tokenizing and transmitting data from the Customer-side and the Reference Source-side may be similar, in that the data may be stored locally initially and subsequently hashed and encrypted on the Customer-owned and/or Reference Source-owned client devices and, once in tokenized form, finally transmitted to third-party servers for analysis, consolidation, and enrichment, among other actions. In other words, FIG. 1 depicts a network topology that may be used in a Customer Environment and/or Reference Source Environment (i.e., client devices 102, 104, and/or 106 may belong to the Client Environment in one example and belong to the Reference Source Environment in another example).

Figure 2:
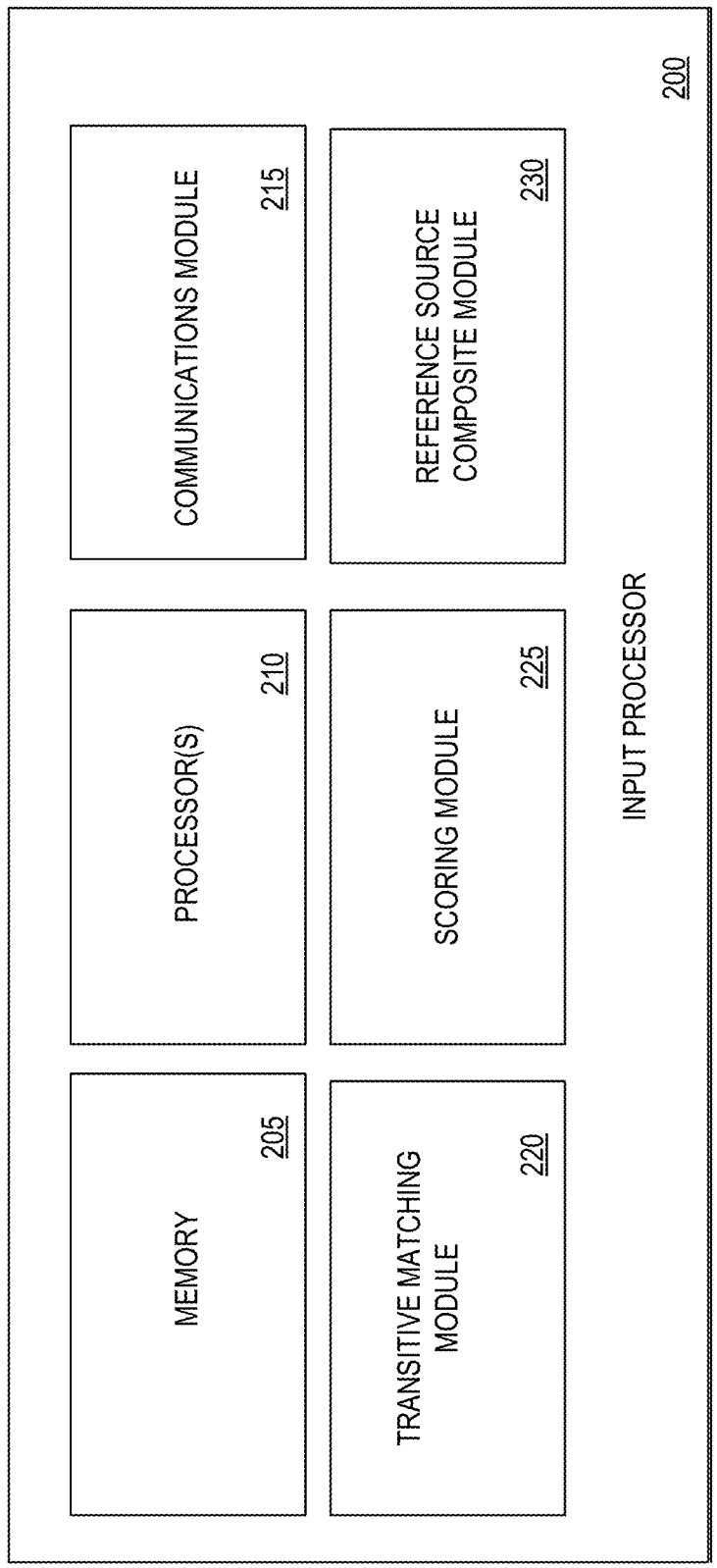
FIG. 2 illustrates an example input processor for operating a data marketplace, as described herein.

FIG. 2 illustrates an example input processor for implementing systems and methods for consolidating and enriching data, as described herein. Input processor 200 may be embedded within a client device (e.g., client devices 102, 104, and/or 106), remote web server device (e.g., devices 116, 118, and/or 120), and other devices capable of implementing systems and methods for consolidating and enriching data. The input processing system contains one or more data processors and is capable of executing algorithms, software routines, and/or instructions based on processing data provided by at least one client source and/or Reference Source. The input processing system can be a factory-fitted system or an add-on unit to a particular device. Furthermore, the input processing system can be a general-purpose computer or a dedicated, special-purpose computer. No limitations are imposed on the location of the input processing system relative to a client or remote web server device, etc. According to embodiments shown in FIG. 2, the disclosed system can include memory 205, one or more processors 210, communications module 215, transitive matching module 220, scoring module 225, and reference source composite module 230. Other embodiments of the present technology may include some, all, or none of these modules and components, along with other modules, applications, data, and/or components. Still yet, some embodiments may incorporate two or more of these modules and components into a single module and/or associate a portion of the functionality of one or more of these modules with a different module.

Memory 205 can store instructions for running one or more applications or modules on processor(s) 210. For example, memory 205 could be used in one or more embodiments to house all or some of the instructions needed to execute the functionality of transitive matching module 220, scoring module 225, and/or reference source composite module 230, as well as communications module 215. Generally, memory 205 can include any device, mechanism, or populated data structure used for storing information. In accordance with some embodiments of the present disclosures, memory 205 can encompass, but is not limited to, any type of volatile memory, nonvolatile memory, and dynamic memory. For example, memory 205 can be random access memory, memory storage devices, optical memory devices, magnetic media, floppy disks, magnetic tapes, hard drives, SIMMs, SDRAM, RDRAM, DDR, RAM, SODIMMs, EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 205.

Communications module 215 is associated with sending/receiving information (e.g., matched by transitive matching module 220, assigned a DQ and/or Value score via scoring module 225, and composited via reference source composite module 230), commands received via client devices or server devices, other client devices, remote web servers, etc. These communications can employ any suitable type of technology, such as Bluetooth, WiFi, WiMax, cellular (e.g., 5G), single hop communication, multi-hop communication, Dedicated Short Range Communications (DSRC), or a proprietary communication protocol. In some embodiments, communications module 215 sends information output by transitive matching module 220 (e.g., matched dataset), by scoring module 225 (e.g., DQ scores associated with particular data attributes, Value scores associated with particular data records), and by reference source composite module 230 (e.g., a consolidated view at the attribute level, such as a table with record numbers as rows and attributes in the column labels filled by 0's and 1's to highlight the existence and/or absence of certain attributes in the record(s)), and/or to client devices 102, 104, and/or 106, as well as memory 205 to be stored for future use. In some examples, communications modules may be constructed on the HTTP protocol through a secure REST server(s) using RESTful services.

Transitive matching module 220 is configured to receive at least two sets of data, e.g., dataset A and dataset B. The module 220 may also receive and maintain a reference dataset (e.g., Reference Source dataset, consolidated reference set, etc.). Module 220 may be configured to compare dataset A to the reference dataset and compare dataset B to the reference dataset. The comparison analysis may reveal that dataset A matches sufficiently to the reference dataset and that dataset B matches sufficiently to the reference dataset. If dataset A matches to the reference dataset and dataset B matches to the reference dataset, then dataset A matches to dataset B via the transitive property. Transitive matching module 220 may also accept single data records and compare the data records to data records from the at least one dataset that is maintained by transitive matching module 220. Transitive matching module 220 is also configured to execute the transitive matching analysis on tokens. In other words, at least two token sets may be compared against a Reference Source token set, and if token set A matches to the Reference token set and token set B matches to the Reference token set, then token set A matches token set B via the transitive property.

Scoring module 225 is configured to analyze a data attribute column and assign a data quality ("DQ") score to that data attribute. Scoring module 225 is also configured to analyze an entire record and its aggregated DQ scores and assign a Value score to the record. As illustrated in this application, a compilation of data records may each indicate the same value for the DOB (date-of-birth) data attribute. As a result, the DOB data attribute column may receive a high DQ score because there are no missing values in that column, and the values in that column are all the same. Conversely, a data attribute column that may have missing (or blank) values and/or different values may receive a lower DQ score, since the data attribute quality cannot be corroborated without discrepancy. As mentioned previously, a Reference Source data attribute may receive a higher DQ score notwithstanding missing data attributes because of the already-verified reliability of the source of that data attribute (e.g., government entity, credit bureau, bank, etc.).

In examples, a customer-owned data composite record may indicate a low DQ score for a particular data attribute. The low DQ score may suggest to the customer that the customer should transact on the data marketplace to obtain that data attribute from a trusted source who may have that data attribute (e.g., a trusted and verified record of that particular data attribute). Lower DQ scores or DQ scores of "0" (i.e., missing data attributes) are indicative of the data attributes that a customer may need to obtain from a trusted reference source on the data marketplace platform, as described herein.

Reference source composite module 230 is configured to analyze a customer-owned token record and a reference source-owned token record to identify potential gaps in the customer token record that may be filled by the reference source token record. The reference source composite module 230 is configured to communicate with transitive matching module 220 and scoring module 225. For example, reference source composite module 230 may use the output generated by transitive matching module 220 between a customer token record and a reference source token record to identify the particular data attributes that are missing (or incorrect, as evidenced by a low DQ score). In other examples, the reference source composite module 230 may rely on the DQ scores and value scores assigned to a customer data record and/or data attribute(s) to identify a ranking of certain data attributes that the customer should consider obtaining via the data marketplace. Importantly, although the description of the reference source composite module 230 uses the term "data," the data marketplace platform does not handle, process, or store raw "data." Rather, the data marketplace platform only handles the comparison of tokens, which are encrypted pieces of a data record, as explained previously. As such, when the reference source composite module 230 identifies certain gaps in a customer's data record, the module 230 is really identifying gaps in a customer's token record. The identified gaps in the token record are then communicated back to the customer, where the customer (who holds the decryption method, e.g., private key) may compare a token record with source indices to comprehend the associated data attribute that the reference source composite module 230 identified as missing and/or could be verified and filled by a trusted reference source via the data marketplace. In some examples, a cost of filling in the data attribute or correcting the data attribute may be associated with the identified data attribute gap that is made visible to the customer from the data marketplace platform.

Figure 3:
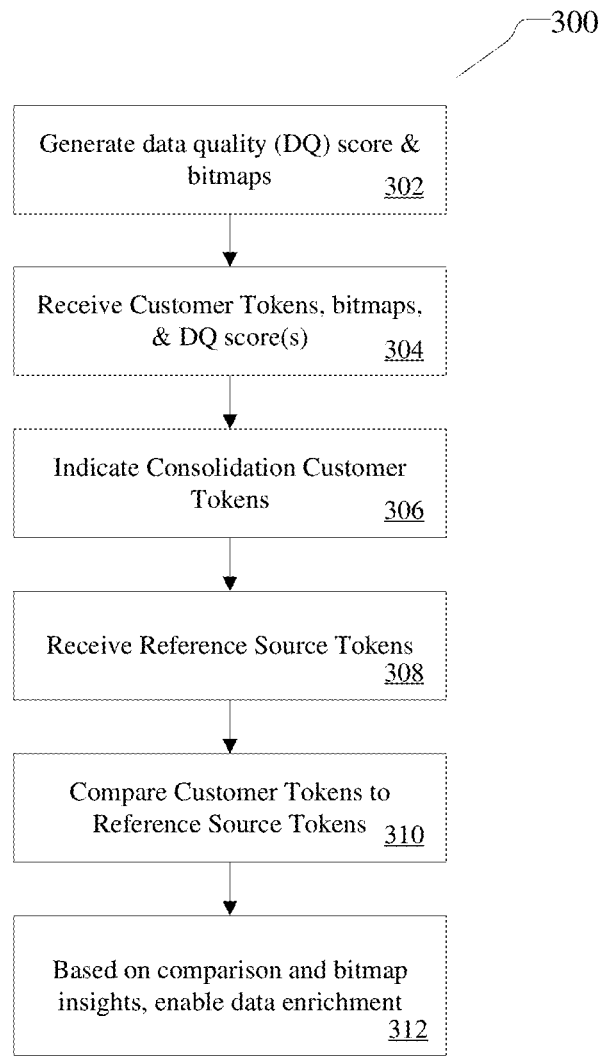
FIG. 3 illustrates an example method for enriching a data record in a data marketplace, as described herein.

FIG. 3 illustrates an example method 300 for enriching a data record in a data marketplace, as described herein. Method 300 may begin with step 302, generate a data quality (DQ) score. A DQ score may be assigned to each attribute in a record at the source (e.g., Customer or Reference Source environment). For instance, a composite record that is made up of multiple records that each have the same value for the "Name" data attribute may have a high DQ score for the "Name" data attribute. On the other hand, a data attribute in a composite that is derived from only a single data record (and not corroborated by other data records) may have a lower DQ score. The more corroboration a data attribute may possess, the higher the DQ score may be.

Furthermore, a DQ score may be influenced by the source of the data attribute. Specifically, Reference Sources that may be the source of a data attribute may receive higher DQ scores for those data attributes than if a data attribute was populated from a non-Reference Source. For example, a composite may be composed of five different data records, and only one of the data records has a certain data attribute (e.g., Social Security Number) populated. Normally, a data attribute without any corroboration from other data records would receive a lower DQ score. However, if the data attribute was derived from a trusted Reference Source (e.g., government entity, credit bureau, etc.), then that particular data attribute may receive a higher DQ score. It is important to note that at the Data Marketplace Platform, the "data" attributes are tokenized, so the Data Marketplace Platform is viewing, analyzing, and matching "token" attributes rather than raw data attributes. Note that each token may comprise a single attribute or multiple attributes. For instance, a single token may refer to a group of five attributes, or in some example aspects, the token may refer to a part of a single attribute. Tokens are not limited to one-to-one matching with attributes.

Additionally, at step 302 202, bitmaps may be created for the Customer records. The bitmaps may indicate the presence of certain attributes in a record. For example, in a record for an individual, each column may represent an attribute. In each column, the number "1" or the number "0" may be indicated. A "1" may indicate that the particular data attribute is present, and the number "0" may indicate that the particular data attribute is not present. For example, an individual record may indicate that the Address attribute is present with a "1," but if the individual record is missing an email address, then that attribute may have a "0" in that particular column. The bitmaps may be used to enable data enrichment, as particular data attributes are indicated as being present or absent. Analysis of such bitmaps may indicate to the Customer which data attributes are possible to obtain from other sources, such as Reference Source(s).

After the DQ scores and bitmaps are generated, the Customer tokens, bitmaps, and the DQ scores may be received by the third-party Data Marketplace Platform at step 304. Prior to step 304, the Customer data may be tokenized at the Customer-side. Prior to receiving the Customer data, Customer client devices may have used a tokenization software program to hash and encrypt (or "mask") the raw Customer data prior to transmission, so what is actually transmitted to the Data Marketplace Platform are Customer "tokens." Once tokenized, the Customer tokens may be transmitted and received by the third-party Data Marketplace Platform at step 304. Note that receiving Customer tokens and DQ scores at step 304 and receiving Reference Source tokens at step 308 may be implemented simultaneously or in vice versa order (with reception of the Reference Source tokens happening before the reception of the Customer tokens).

The Customer tokens may be received by the Data Marketplace Platform and stored on secured servers. After reception of the Customer tokens, at least one composite (i.e., a consolidation of at least two Customer token records) may be indicated at step 306. A composite refers to the consolidation of multiple token records to create a single token record. For example, the Customer tokens may make up multiple token records associated with the same data subject (although, the third-party Data Marketplace Platform is unable to identify this data subject because the information is tokenized on the third-party Data Marketplace Platform). A composite of the data subject may be created by consolidating the multiple token records associated with that same data subject. Specifically, one token record may include tokens that, when referenced, represent data attributes such as Name, date of birth (DOB), Gender, and physical address, while another token record may include tokens that represent data attributes such as Name, email address, and age. The composite record, when referenced back via at least one look-up table (e.g., a table containing a third-party synthetic unique record ID table with one-to-one relation with a customer and/or reference source record IDs) or software/algorithm in the Customer environment and/or the Reference Source environment, would include all of the aforementioned data attributes: Name, DOB, Gender, physical address, email address, and age. The end result is a composite record, which is a more fulsome record associated with a certain data subject and/or entity. Such a composite record is created in the Customer Environment, so while the third-party Data Marketplace Platform may facilitate the identification of certain records to be consolidated and/or enriched, the actual consolidation and enrichment happens at the Customer Environment prior to transmission of the Customer tokens to the Data Marketplace Platform. As used herein, "data subject" may be a person, product, business, entity, etc. The systems and methods described herein are not limited to simply personal data related to human data subjects but can be applied to supply chain data, product data, business entity data, etc.

In other example aspects, a composite of a data subject may be created after the Data Marketplace Platform receives the Reference Source tokens at step 308. For instance, if record A and record B from the Customer tokens are matched up, there may not be enough similarities for there to be a successful match. This may result in a false negative if record A and record B are indeed records associated with the same data subject. By using the Reference Source dataset, the system may use a technique known as transitive closure to accurately determine if record A and record B are associated with the same data subject, and if so, create a composite of those records. Record A may be matched up with the Reference Source token record, and Record B may be matched up with the Reference Source token record. If the comparison of the records reaches a certain matching threshold that confidently determines that record A matches with the Reference Source and that record B matches with the Reference Source (i.e., A=R and B=R), then we know that records A and B must match due to the transitive property. Furthermore, the transitive matching may also identify which tokens are missing from the customer token record but are present in the reference source token record. These tokens that are present in the reference source but not the customer source may be presented to the customer for purchase in order to fill out/complete the customer's token record.

The Reference Source tokens that may be used to help generate a composite of the Customer tokens may derive from a different Reference Source than the Reference Source token set that is received at step 308 and ultimately compared with the composite Customer tokens to populate missing and/or confirm low-DQ-score data attributes. In other example aspects, the Reference Source that is used to create the composite and match Customer records may be the same Reference Source that is received in step 308 and used to populate missing or low-DQ-score data attributes in the Customer tokens. In further examples, more than one Reference Source token set may be used to match tokens of the Customer token set and create a composite of the Customer tokens.

Reference Source tokens may be received at step 308. As noted earlier, the Reference Source tokens may be received prior to, simultaneously with, or after the Data Marketplace Platform receives the Customer tokens at step 302. Similar to the Receive Customer Tokens step at step 302, the Reference Source data may also be tokenized prior to transmission to the Data Marketplace Platform. The Reference Source devices may use a third-party tokenization software program (e.g., a tokenization software from the Data Marketplace Platform or another third-party) to tokenize its data prior to transmission. Once tokenized, the Reference Source tokens may be transmitted and received by the Data Marketplace Platform. The Data Marketplace Platform will now possess both Customer tokens and Reference Source tokens. As noted with respect to FIG. 1, these tokens may be stored on secured servers owned by the Data Marketplace Platform, third-party cloud servers, and/or local devices managed by the Data Marketplace Platform.

At step 310, the Customer tokens are compared to the Reference Source tokens. At this step, the Customer tokens may refer to single customer token records and/or composite customer token records (i.e., individual customer token records that have previously been composited via, e.g., transitive closure). The comparison of the Customer tokens to the Reference Source tokens may indicate whether certain Customer tokens match up to Reference Source tokens and which tokens the Customer token record is missing. Furthermore, bitmaps may indicate certain gaps in the Customer token records that may be filled in using the Reference Source token records. Note that the Reference Source tokens may be comprised of a single Reference Source and/or multiple Reference Sources. The matching and enrichment process may include analyzing the DQ scores for each of the attributes. The data attributes with the lowest DQ scores may receive higher priority than other data attributes with higher DQ scores. The data attributes that are completely missing (e.g., DQ score of "0") may receive the highest priority during the comparison step at 310.

In some example aspects, a ranking of data attributes to be populated and/or confirmed for accuracy by the Reference Source tokens may be generated. The ranking of the data attributes may occur at the Data Marketplace Platform where the attributes are processed and ranked as tokens. The ranking of data attributes may be provided back to the Customer in a list form (where the Customer has access to the look-up table or software/algorithm to correlate to the source and data attributes), and each data attribute in the ranking list may have a monetary price associated with it. For instance, in order for the Customer to receive a certain populated data attribute, the Customer may need to pay a certain amount of money to receive that data attribute from the Reference Source and/or the Data Marketplace. The Data Marketplace Platform may facilitate this transaction through the systems and methods described herein. The Customer may elect to populate/update certain data attributes and forgo populating/updating others.

After the matching analysis and the bitmap insights analysis is completed at step 310, data enrichment for the Customer may be enabled at step 312. For example, the token matching and bitmap insights from step 310 may have revealed that a Reference Source may possess a complete data record for a data subject that includes an email address, whereas client records A, B, and C did not have an email address associated with the data subject. The third-party Data Marketplace Platform notifies the Customer that a certain Reference Source has the email address data attribute, and as such, the Customer can obtain that data attribute from the Reference Source. The Data Marketplace Platform would recognize that the Customer record has a missing data value and would indicate the corresponding record/data from the Reference Source that can be used to populate the missing record at the Customer environment. The Data Marketplace Platform facilitates the data enrichment process between a Customer and a Reference Source, but the actual population of missing data attributes or matching data records happens at the Customer environment, not on the Third-Party Data Marketplace Platform.

Figure 4:
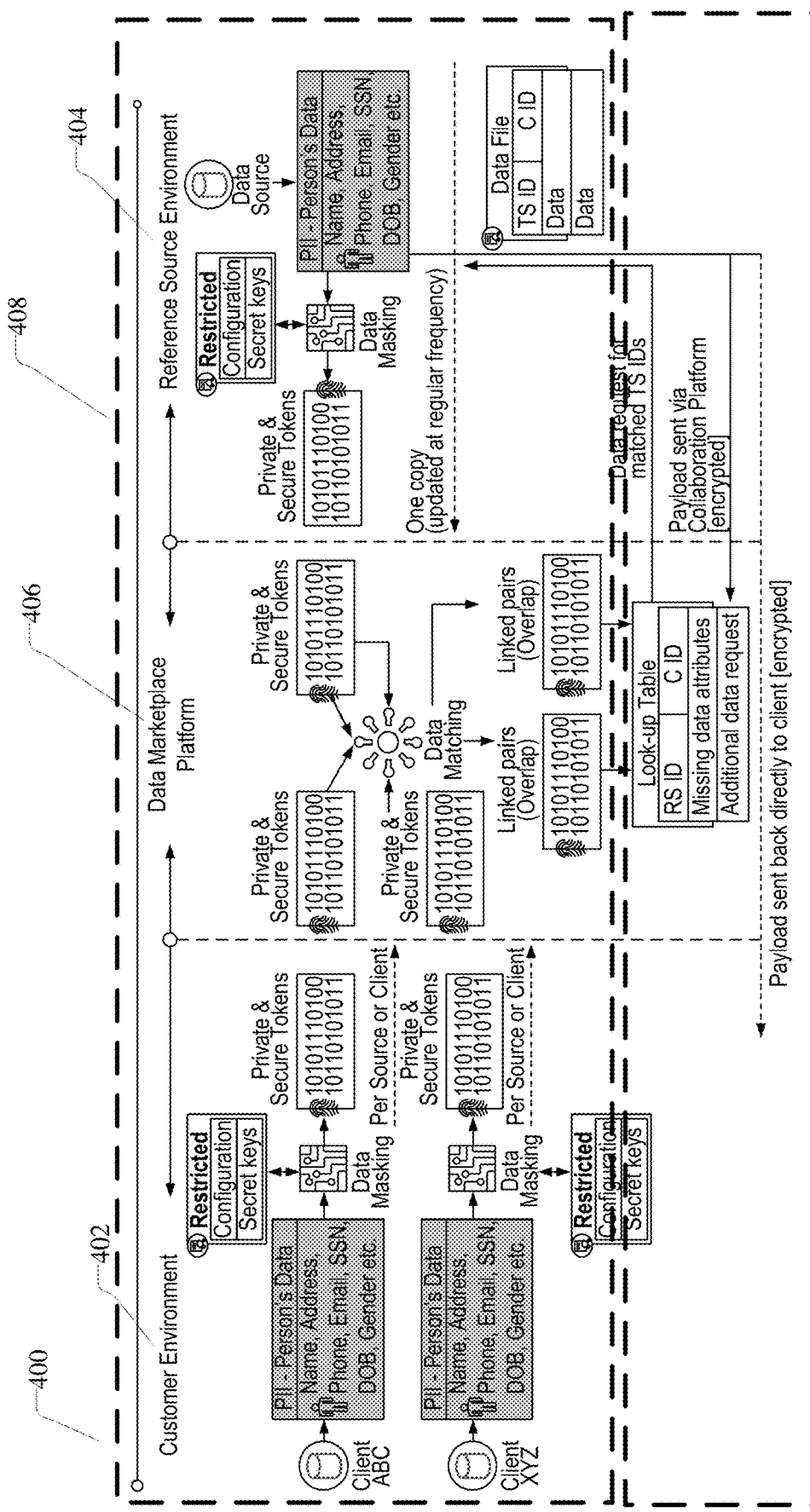
FIG. 4 illustrates an example of a distributed system that includes the data Marketplace Platform, Customer Environment, and Reference Source Environment.

FIG. 4 illustrates an example of a distributed system that includes the Data Marketplace Platform, Customer Environment, and Reference Source Environment. The distributed system in FIG. 4 is an example data registry 400. The data registry 400 may be comprised of the Customer environment 402, Reference Source environment 404, and Data Marketplace Platform 406. As shown in the Customer environment 402, data may be received from multiple Customer databases (e.g., databases Client ABC and/or Client XYZ). The data may contain multiple data attributes associated with a data subject, such as Name, Address, Phone, Email, SSN, DOB, Gender, etc. The Customer data may be tokenized inside of the Client Environment 402. Once tokenized, the client tokens may be transmitted to the Data Marketplace Platform 406.

Similarly, the Reference Source Environment 404 may include data that includes data attributes associated with a data subject. The data may be masked within the Reference Source Environment. After the data is masked, it may be transmitted to the Data Marketplace Platform 406.

The Data Marketplace Platform 406 may receive the tokens from the Customer and the Reference Source in the form of private and secure tokens. A similar tokenization algorithm may be applied to the Customer tokens as the Reference Source tokens to facilitate efficient matching and identification of missing data attributes in the Customer token set. Within the Data Marketplace Platform 406, the tokens from the Customer and the Reference Source may be compared. At the comparison step, linked pairs (i.e., "overlap") may be identified with tokens. In some examples, a record may also consist of a bit string (i.e., string of 1's and 0's). A "1" may indicate that a certain data attribute exists, whereas a "0" may indicate that the data attribute does not exist. When the tokens for a record are compared, if token or tokens of records have the same value then a linked pair is established based on an established threshold. The bitmap (bit string with 0s and 1s) for each matched pair independently highlights availability of data attribute for that record. For example, if the bit values in matched record pair are different, then at least one of the token records has the data attribute, whereas the other token record does not. If both token records have a "0" in the column, then that particular corresponding data attribute is missing.

The linked pairs may indicate that certain records match up (i.e., the data record from the client may be corroborated by the Reference Source). The comparison of bitmaps for the linked pairs may indicate that the data attribute is missing in the Customer bitmap highlighted by '0s' (and therefore missing from the Customer dataset in the Client Environment). Upon detecting an 0s in a linked pair, the Data Marketplace Platform system may generate a request back to the Reference Source to obtain and/or confirm a certain data attribute in a record set. The Reference Source may either transmit an encrypted payload (clear text data attributes) directly to the customer or via the Data Marketplace Platform. The Data Marketplace Platform 406 does not harbor un-tokenized client (e.g., Customer and/or Reference Source) data.

For clarity, box 408 indicates the systems and processes for data matching, whereas the box 410 indicates the processes for data enrichment, which derive from bitmap insights. For example, a customer wishing to fill in gaps in a data record (i.e., obtain a data attribute for a data record that the customer presently does not have), the customer may transact on the data marketplace platform 406 within box 408. On the data marketplace platform 406, if a reference source has the missing data attribute (which will be identified in the form of a token on the data marketplace platform 406), then the data marketplace platform 406 may inform the customer that a trusted reference source has the missing the data attribute. The transmission of the actual substance of that data attribute occurs in box 410, wherein a payload is transmitted directly from the reference source environment 404 to the customer environment 402, so that raw data is not transferred via or stored on the data marketplace platform 406.

Figure 5:
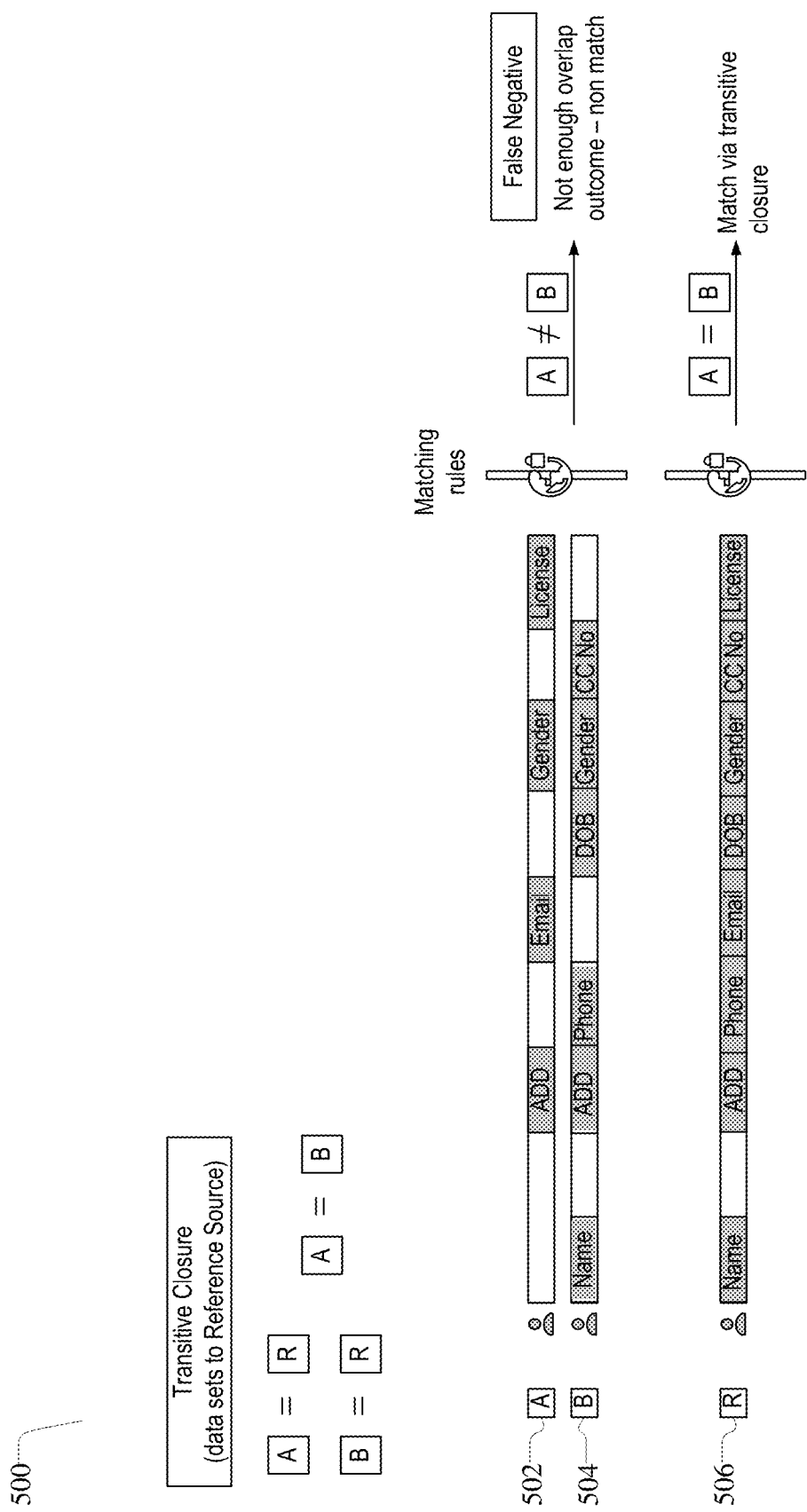
FIG. 5 illustrates an example of transitive matching using a Reference Source.

FIG. 5 illustrates an example 500 of transitive matching using a Reference Source. As illustrated in example 500, data records A (502) and B (504) may contain certain data attributes. Record A (502) may contain an address, email, gender, and license type. Record B (504) may contain name, address, phone, DOB, gender, and credit card number. When these two records are compared to create a "composite" record, however, the system may determine that there is not enough information/overlap between these two records to confidently determine that the records are related to the same data subject. In other words, comparing just record A and record B may result in a "false negative."

By introducing a Reference Source (R) data record 506, records A and B can be matched via the transitive property. In other words, Record A may be compared to Record R, and sufficient overlap may be present to confidently determine that the records are associated with the same data subject. Record B may also be compared to Record R, and sufficient overlap may be present to confidently determine that the records are associated with the same data subject. As such, if Record A=Record R and Record B=Record R, then Record A=Record B.

The transitive matching example 500 may be applied when creating a composite of data records, such as in step 304 of method 300. At least one Reference Source may be utilized to determine whether certain Customer data records are associated with the same data subject.

Of note, at the Data Marketplace Platform, the transitive matching occurs via tokens—the data attributes displayed in FIG. 5 are for understanding purposes only, as the "data" that is actually received and processed by the Data Marketplace Platform is tokenized. In other words, the Data Marketplace Platform is blind to the underlying raw data that the tokens represent. The Data Marketplace Platform, for example, does not know the actual data value of Customer data record A and Customer data record B matching Addresses. Rather, the Data Marketplace Platform knows that Customer token record A and Customer token record B have a matching token between the two token records.

Figure 6:
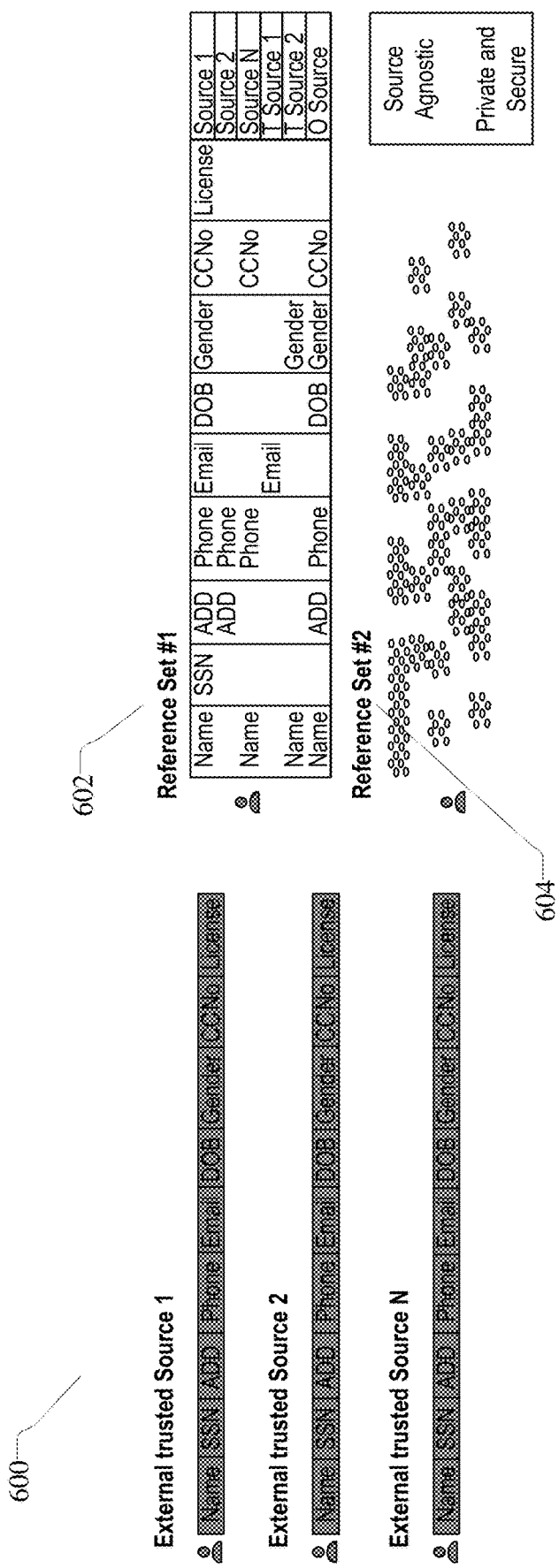
FIG. 6 illustrates an example of a consolidated reference set created from external trusted sources.

FIG. 6 illustrates an example 600 of consolidated reference sets 602, 604 created from at least one Trusted Source. A consolidated reference set may be a composite of multiple datasets from Trusted Sources. The consolidated reference set may be utilized by a data broker to efficiently identify which data attributes from a client dataset may be corroborated and/or populated by a Trusted Source and which Trusted Source may possess the relevant data. By utilizing a consolidated reference set, a data broker may be more easily to provide recommendations to the client as to which Trusted Source may have the most relevant data to corroborate and/or populate certain data attributes.

As illustrated, Reference Set #1 (602) displays the various data attributes associated with a data subject that have been compiled by various data sources (e.g., Source 1, Source 2, Source N, T Source 1, T source 2, O Source, etc.). However, in the Data Marketplace environment (406 from FIG. 4), the Reference Set #1 (602) will appear as Reference Set #2 (604), where particular data attributes and sources are not actually identifiable, since they are tokenized on the data marketplace environment.

External trusted Sources 1, 2, and N may represent individual trusted sources, such as banks, credit unions, government entities, etc. A composite of these individual trusted sources may be created to establish a consolidated reference set (e.g., reference set 602/604). The consolidated reference set may be a tokenized reference set that is stored on the data marketplace and used to identify missing tokens (underlying data attributes) of customer data records.

Figure 7:
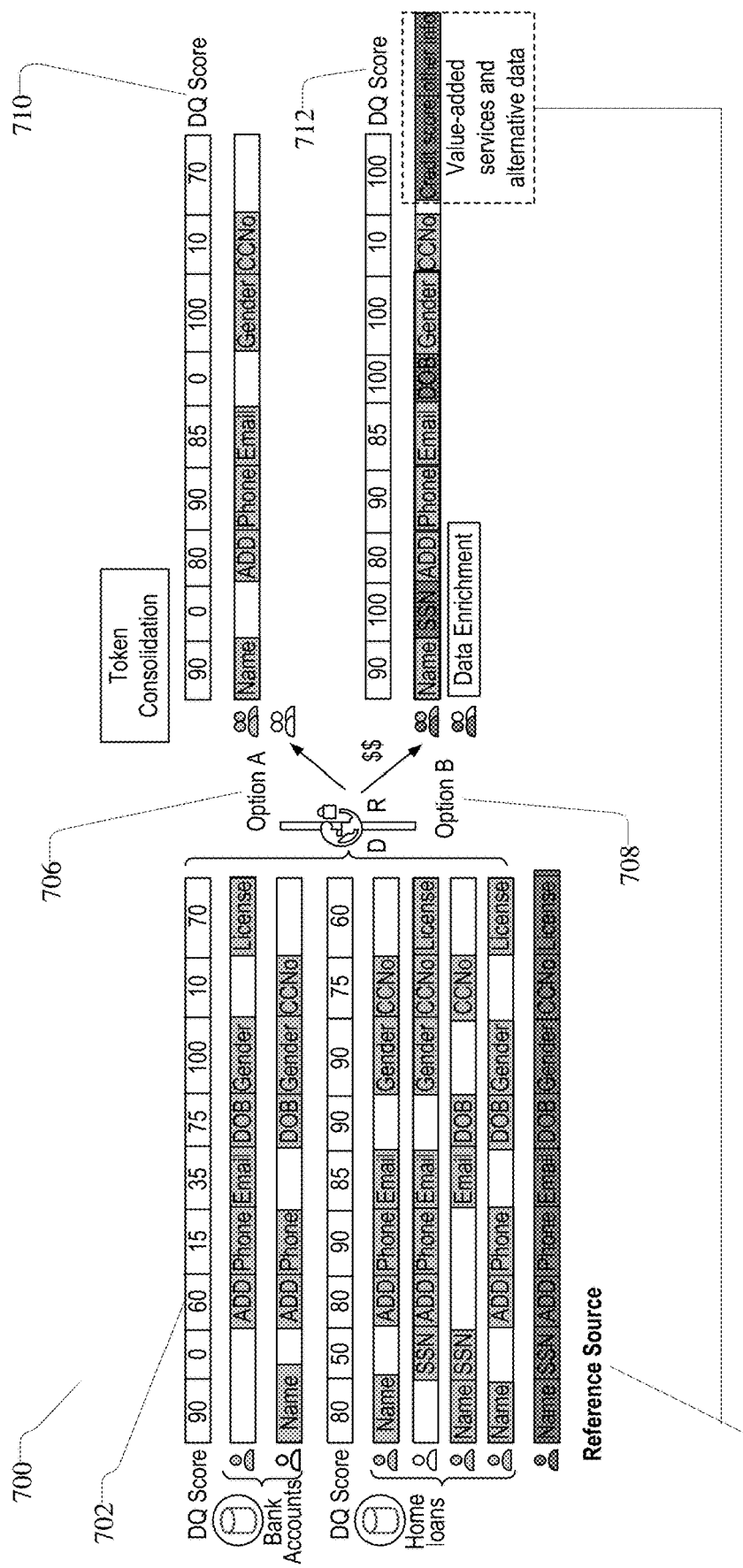
FIG. 7 illustrates examples of providing data quality (DQ) scores, consolidating multiple token records, and enriching records using at least one Reference Source.

FIG. 7 illustrates an example 700 of providing data quality (DQ) scores, consolidating multiple data records, and enabling the enrichment of data records using at least one Reference Source 704. In the example 700, Customer data may be derived from a Bank Accounts database and/or Home loans database (i.e., the Customer in this example is a Bank). The databases may comprise data records that are associated with the same data subject. For instance, an individual may have opened a checking account with the Customer. Upon opening a checking account, a data record may have been created for that individual. Later, the same individual may have applied for a home loan with the Customer, and a subsequent data record may have been created for the individual. Thus, at least two separate data records exist for the same individual—one in the Bank Accounts database and one in the Home loans database. Each of these data records may contain overlapping information, but either of the records may contain certain data attributes that the other data record does not possess. It may be advantageous for the Customer to consolidate these data records into a single composite data record. It may further be advantageous for the Customer to fill in the missing data attributes of the data record via the data marketplace.

Option A (706) for the client is to simply combine the data records from the Bank Account and the Home loan, but, as mentioned previously, there may not be sufficient overlap for the system to determine that these data records are, indeed, associated with the same individual. But just in case they do match, there may still be insufficient quality of data available for consolidated records in Option A. Option B (708) uses a Reference Source to create the composite. The data records from the Bank Account and the Home loan may be matched using the transitive property with the Reference Source, as described with respect to FIG. 5 and may provide superior data quality for the consolidated record.

As illustrated, the DQ scores 702 of the first data record associated with the Bank Accounts are overall lower than the DQ scores 710 and 712. Option A DQ Scores 710 shows the DQ Score for the data attribute of "address" as increasing from 60 (in DQ score 702) to 80 in Option A's DQ score 710 because the data record from Bank Account and data record from Home loans possessed the same address data attribute, but the DQ score for the Address attribute in the Home loans database is higher than the DQ score in the Bank Accounts database. Therefore, the system selects the higher DQ score data attribute. As such, the data quality of that data attribute increases because that data attribute has at least some corroboration. The missing data attributes are assigned a "0" score.

In Option B, by using the transitive property and at least one Reference Source 704, the client data may be enriched, as evidenced by the increased DQ scores 712. In some cases, the enrichment is with data attributes 704 (value-added services and alternative data) not available in a client data set and made visible for the matching data records from a reference data source. The DQ scores for previously missing data attributes (e.g., SSN and DOB attributes) may be increased and ultimately verified (score of "100") by the Reference Source dataset.

From the perspective of the Data Marketplace Platform, the consolidation of data records is actually in the form of tokens. The Data Marketplace Platform may receive multiple tokenized records from the Customer, and the Data Marketplace Platform may compare the token records and offer options of data consolidation from same customer data sources. Similarly, when the token records from the Customer are compared and processed with the Reference Source token set, the data enrichment options are enabled at the Customer environment. In other words, the Data Marketplace Platform simply identify missing data attributes along with value-added data attributes via token records and enable data enrichment for the Customer token record, but the data enriched can only happen in Customer environment, the Customer is able to use at least one look-up table or software/algorithm to correlate sources records and obtain enriched data.

Figure 8:
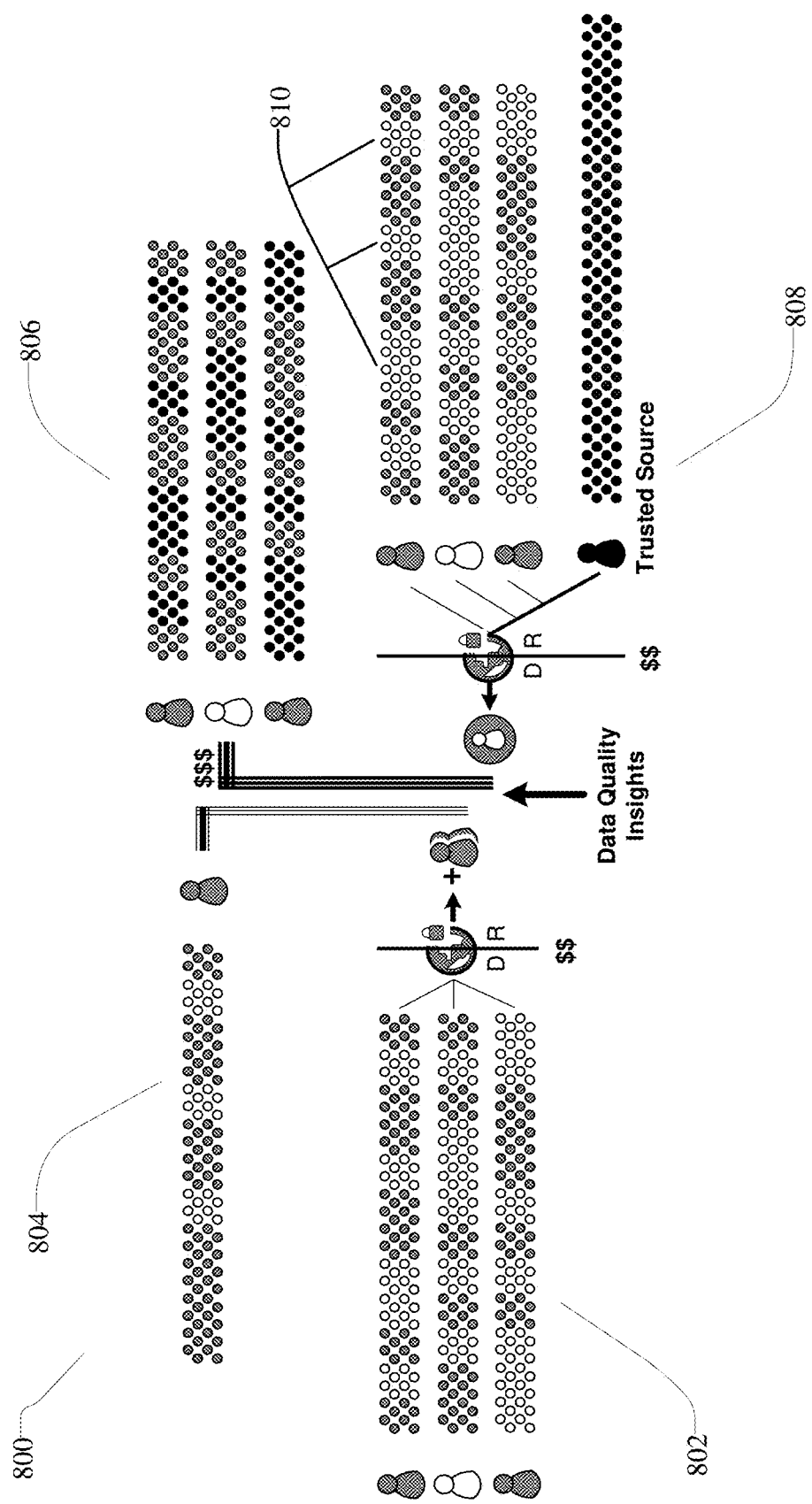
FIG. 8 illustrates an example of enriching a consolidated customer token record using a trusted source token record.

FIG. 8 illustrates an example of enriching a consolidated customer token record using a trusted source token record. In data marketplace environment 800, customer data records (tokenized records) are illustrated by token records 802. In the example, the customer has three separate data records corresponding to the same entity. If the customer wishes to create a composite of the data entity by combining these three separate data records, the customer can do so via the systems and methods described herein. A composite record may be created, illustrated by token record 804. The process of generating a composite of a customer's data records may be referred to as a data quality insights process.

Additionally, a customer may wish to identify and fill in missing data attributes for a data record. The data record may be an individual data record (e.g., token records 802) or a composite data record (e.g., composite token record 804). By comparing customer token records to trusted source token records, missing tokens (i.e., encrypted data attribute(s)) may be identified and filled in. In the example in FIG. 8, a trusted source record 808 may exist that possesses all of the data attributes for a certain data entity. A customer may observe that by purchasing the missing data attributes from the trusted source 808, the customer's data records 802 may become complete, as illustrated in data records 806. In the illustrated example, the data record(s) have three portions of the data record that are missing (which may indicate at least three missing data attributes, or more or less missing data attributes, since a token does not always equal one data attribute), as illustrated by 810 and composite data record 804. The three white tokenized portions of the composite data record 804 indicate the missing attributes. When the missing tokens from the customer record are filled in via the trusted source record 808, complete customer records may be generated as shown by completed customer data records 806. As noted earlier, the data marketplace environment does not store or transact with raw data. The data marketplace environment deals with tokens. Ultimately, the customer will receive information from the data marketplace environment, indicating certain missing tokens. The customer will be able to decrypt that information using the customer's private key, for example. The customer may then indicate to the data marketplace that the customer wants to purchase the missing data attributes from the trusted source. The data marketplace may then provide that indication to the trusted source, and the trusted source may transact with the customer directly, as shown in FIG. 4, box 410.

Figure 9:
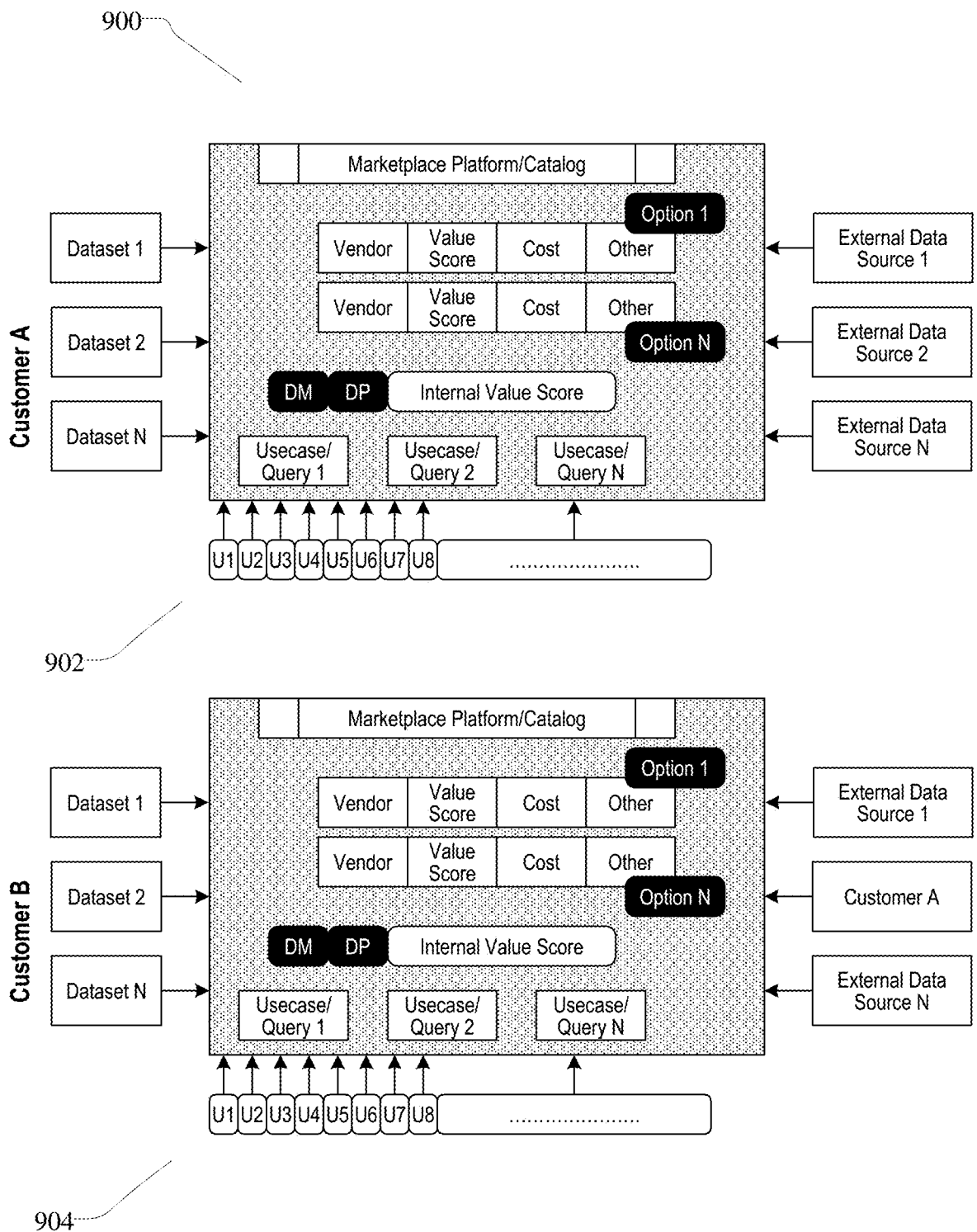
FIG. 9 illustrates an example data marketplace platform.

FIG. 9 illustrates an example data marketplace platform. Environment 900 illustrates two separate instances of the data marketplace platform as described herein. In both instances, data marketplace instance 902 and data marketplace instance 904 provide the same data fulfillment services to customers A and B. Depending on the needs of customers A and B, the data marketplace options may be different. For instance, customer A may be searching to fill a data attribute for a data record regarding a particular product. Certain trusted sources (e.g., external data sources 1, 2, and N) may be focused on providing data attributes for products. Customer B may be searching to fill a data attribute for a business entity, and, as such, may be transacting with different trusted sources than Customer A. In one scenario, customer A may be one of the external sources (trusted reference source) for customer B data marketplace and vice-versa. This is illustrated in the data marketplace instance 904, which shows Customer A data as an external source that may be utilized by Customer B when searching to fill missing data attributes or enriching value-added data attributes. Based on various factors, such as scarcity of the data attribute, reputation of the trusted source, etc., the cost of obtaining the data attribute may vary. Different use-cases and queries may require more or less expensive searching to fill missing data attributes or enriching value-added data attributes. Ultimately, the customer will be able to see if the missing data attributes or value-added data attributes are available for purchase, and if so, choose within the data marketplace which trusted source from which to purchase the data attributes. In other scenario, customers A and B are searching for missing or value-added data attributes for many business or technical use cases at the same time.

Figure 10:
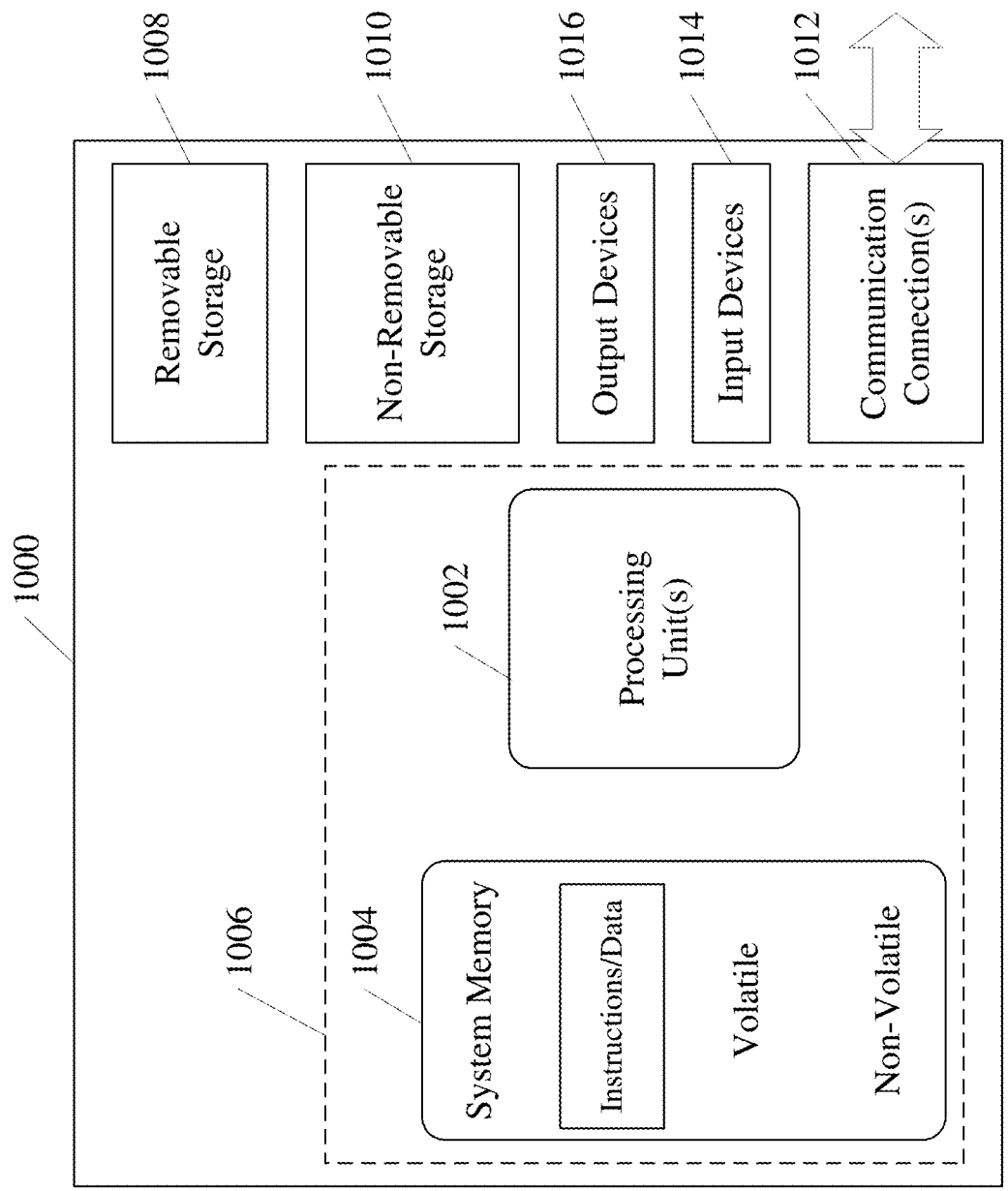
FIG. 10 illustrates one example of a suitable operating environment in which one or more of the present embodiments may be implemented.

FIG. 10 illustrates one example of a suitable operating environment in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, handheld or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 1000 typically includes at least one processing unit 1002 and memory 1004. Depending on the exact configuration and type of computing device, memory 1004 (storing, among other things, information related to detected devices, association information, personal gateway settings, and instructions to perform the methods disclosed herein) may be volatile (such as RAM), nonvolatile (such as ROM, flash memory, etc.), or some combination of the two. This most basic configuration is illustrated in FIG. 10 by dashed line 1006. Further, environment 1000 may also include storage devices (removable, 1008, and/or non-removable, 1010) including, but not limited to, magnetic or optical disks or tape. Similarly, environment 1000 may also have input device(s) 1014 such as keyboard, mouse, pen, voice input, etc. and/or output device(s) 1016 such as a display, speakers, printer, etc. Also included in the environment may be one or more communication connections, 1012, such as LAN, WAN, point to point, etc.

Operating environment 1000 typically includes at least some form of computer readable media. Computer readable media can be any available media that can be accessed by processing unit 1002 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible medium which can be used to store the desired information. Computer storage media does not include communication media.

Communication media embodies non-transitory computer readable instructions, data structures, program modules, or other data. Computer readable instructions may be transported in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 1000 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

From the foregoing, it will be appreciated that specific embodiments of the invention have been described herein for purposes of illustration, but that various modifications may be made without deviating from the scope of the invention. Accordingly, the invention is not limited except as by the appended claims.

What is claimed is:

1. A system for enriching data via a data marketplace, comprising:
   a memory configured to store non-transitory computer readable instructions; and
   a processor communicatively coupled to the memory, wherein the processor, when executing the non-transitory computer readable instructions, is configured to:
   receive at least one customer token record and at least one customer bitmap associated with the at least one token record from a customer source;
   receive at least one reference token record and at least one reference bitmap associated with the at least one reference token record from a reference source;
   compare the customer bitmap and the reference bitmap;
   based on the comparison results of the customer bitmap and the reference bitmap, identify at least one missing data attribute from the customer token record;
   rank the at least one missing data attribute, wherein the ranking indicates a priority of population;
   identify at least one present data attribute from the reference token record that corresponds with the at least one missing data attribute from the customer token record,
   wherein the reference token record anonymizes the at least one present data attribute by including at least one anonymized label that restricts access to the at least one present data attribute to entities having access to a type of information corresponding to the at least one anonymized label; and
   transmit a message to the customer source, wherein the message comprises instructions to enrich the customer token record with the present data attribute from the reference token record.

2. The system of claim 1, further comprising transmitting a message to the customer source, wherein the message comprises an indication that the at least one missing data attribute is present via reference token record.

3. The system of claim 2, wherein the message further comprises at least one price associated with obtaining the at least one present data attribute from the reference source.

4. The system of claim 1, wherein the reference source is a consolidated reference source, wherein the consolidated reference source is comprised of a plurality of reference sources.

5. The system of claim 1, further configured to assign at least one data quality (DQ) score to each data attribute in a customer data record.

6. The system of claim 5, wherein the customer token record is generated by tokenizing each data attribute in the customer data record using the at least one anonymized label to anonymize the customer token record.

7. The system of claim 1, wherein the reference source is at least one of: a trusted named organization, a government entity, a credit bureau, and a bank.

8. The system of claim 6, further configured to generate a ranking of missing tokens in the customer token record, wherein the ranking is based on the at least one DQ score associated with each tokenized data attribute.

9. The system of claim 1, wherein the customer token record is a composited customer token record, wherein the composited customer token record is comprised of at least two non-composited customer token records.

10. The system of claim 1, further configured to receive an indication from the customer source that the customer source desires to obtain the at least one present data attribute from the reference source.

11. A method for enriching data via a data marketplace, comprising:
receiving at least one customer token record from a customer source;
receiving at least one reference token record from a reference source;
comparing the customer token record and the reference token record;
based on the comparison results of the customer token record and the reference token record, identifying at least one missing data attribute from the customer token record;
ranking the at least one missing data attribute, wherein the ranking indicates a priority of population;
identifying at least one present data attribute from the reference token record that corresponds with the at least one missing data attribute from the customer token record,
wherein the reference token record anonymizes the at least one present data attribute by including at least one anonymized label that restricts access to the at least one present data attribute to entities having access to a type of information corresponding to the at least one anonymized label;
transmitting at least one message to the customer source indicating the presence of the at least one present data attribute from the reference token record;
receiving at least one indication from the customer source, wherein the at least one indication indicates a desire to purchase the at least one present data attribute from the reference source; and
transmitting a message to the customer source, wherein the message comprises instructions to enrich the customer token record with the present data attribute from the reference token record.

12. The method of claim 11, wherein the customer token record and the reference token record are masked with at least one of the following algorithms: hashed message authentication code (HMAC) protocol, SHA2 512/256 token, TripleDES, Twofish, Blowfish, Advanced Encryption Standard (AES), IDEA encryption algorithm, MD5, and RSA.

13. The method of claim 12, wherein the customer token record and the reference token record are encrypted with the same encryption algorithm.

14. The method of claim 11, wherein the reference source is a consolidated reference source comprised of a plurality of reference sources.

15. The method of claim 14, wherein the reference source is at least one of: a trusted named organization, a government, a credit bureau, and a bank.

16. The method of claim 11, further comprising:
generating at least one data quality (DQ) score associated with at least one data attribute of a customer data record;
tokenizing the at least one data attribute; and
generating the customer token record.

17. The method of claim 16, further comprising generating a ranking of missing tokens in the customer token record, wherein the ranking is based on the at least one DQ score associated with each tokenized data attribute.

18. The method of claim 11, wherein the customer token record is a composite customer token record generated via transitive matching.

19. The method of claim 11, wherein the at least one message comprises a price for obtaining the at least one present data attribute from the reference source.

20. A non-transitory computer-readable media storing instructions that when executed cause a computing system to perform a method for enriching data comprising:
receiving at least one customer token record and at least one customer bitmap associated with the at least one token record from a customer source;
receiving at least one reference token record and at least one reference bitmap associated with the at least one reference token record from a reference source;
comparing the customer bitmap and the reference bitmap;
based on the comparison results of the customer bitmap and the reference bitmap, identifying at least one missing data attribute from the customer token record, wherein the at least one missing token is designated by a 0 bit in the customer bitmap and wherein the at least one missing data attribute is a value-add data attribute;
ranking the at least one missing data attribute, wherein the ranking indicates a priority of population;
identifying at least one present data attribute from the reference token record that corresponds with the at least one missing data attribute from the customer token record, wherein the at least one present data attribute is designated by a 1 bit in the reference token record,
wherein the reference token record anonymizes the at least one present data attribute by including at least one anonymized label that restricts access to the at least one present data attribute to entities having access to a type of information corresponding to the at least one anonymized label; and
transmitting a message to the customer source, wherein the message comprises instructions to enrich the customer token record with the present data attribute from the reference token record.

* * * * *